United States Patent
Koga

(10) Patent No.: US 8,194,319 B2
(45) Date of Patent: Jun. 5, 2012

(54) OPTICAL SYSTEM AND OPTICAL APPARATUS INCLUDING THE SAME

(75) Inventor: Hironobu Koga, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/027,656

(22) Filed: Feb. 15, 2011

(65) Prior Publication Data
US 2011/0134530 A1 Jun. 9, 2011

Related U.S. Application Data

(63) Continuation of application No. PCT/JP2009/064793, filed on Aug. 25, 2009.

(51) Int. Cl.
*G02B 5/18* (2006.01)

(52) U.S. Cl. .......................... 359/566; 359/569; 359/793

(58) Field of Classification Search .................. 359/566, 359/569, 576, 776, 793, 676
See application file for complete search history.

(56) References Cited

U.S. PATENT DOCUMENTS

| | | | |
|---|---|---|---|
| 5,790,321 A | 8/1998 | Goto | |
| 7,312,935 B2 * | 12/2007 | Kobayashi | 359/776 |
| 7,480,102 B2 * | 1/2009 | Yokoyama | 359/676 |
| 7,643,228 B2 * | 1/2010 | Ishibashi | 359/793 |
| 7,710,651 B2 * | 5/2010 | Yasui | 359/576 |
| 7,864,456 B2 * | 1/2011 | Ishibashi | 359/793 |
| 2008/0130141 A1 | 6/2008 | Ishibashi | |
| 2008/0144188 A1 | 6/2008 | Hamano | |
| 2009/0185282 A1 | 7/2009 | Ishibashi | |
| 2009/0201585 A1 | 8/2009 | Yasui | |
| 2009/0284847 A1 | 11/2009 | Ishibashi | |

FOREIGN PATENT DOCUMENTS

| | | |
|---|---|---|
| JP | 6-324262 A | 11/1994 |
| JP | 2008-139645 A | 6/2008 |
| JP | 2008-151846 A | 7/2008 |
| JP | 2008-203304 A | 9/2008 |
| JP | 2008-292732 A | 12/2008 |
| JP | 2009-169129 A | 7/2009 |
| JP | 2009-169249 A | 7/2009 |
| JP | 2009-186888 A | 8/2009 |
| JP | 2010-008809 A | 1/2010 |

* cited by examiner

*Primary Examiner* — Audrey Y Chang
(74) *Attorney, Agent, or Firm* — Canon U.S.A., Inc. IP Division

(57) ABSTRACT

An optical system and an optical apparatus capable of properly correcting chromatic aberration over a visible wavelength range are obtained. An optical system includes a diffractive optical element and a refractive optical element on at least one of an object side and an image side of a stop. The following conditions are satisfied:

$|\Delta\theta_{gd}| > 0.038$ $0.003 < |\delta\theta_{dC}| < 0.038$ $(\Phi_R \times v_d \times \delta\theta_{dC}) \times (-\Phi_D) < 0$ where $v_d$ represents an Abbe number of the refractive optical element, $\theta_{gd}$ represents a partial dispersion ratio for a g-line and a d-line, $\theta_{dC}$ represents a partial dispersion ratio for the d-line and a C-line, $\Phi_R$ represents an optical power provided when light incident and exit surfaces of the refractive optical element are both in contact with air, and $\Phi_D$ represents an optical power of the diffractive optical element. Here, $\Delta\theta_{gd} = \theta_{gd} - (-1.687 \times 10^{-7} \cdot v_d^3 + 5.702 \times 10^{-5} \cdot v_d^2 - 6.603 \times 10^{-3} \cdot v_d + 1.462)$, and $\delta\theta_{dC} = \theta_{dC} - (-0.1968\theta_{gd} + 0.5480)$.

6 Claims, 14 Drawing Sheets

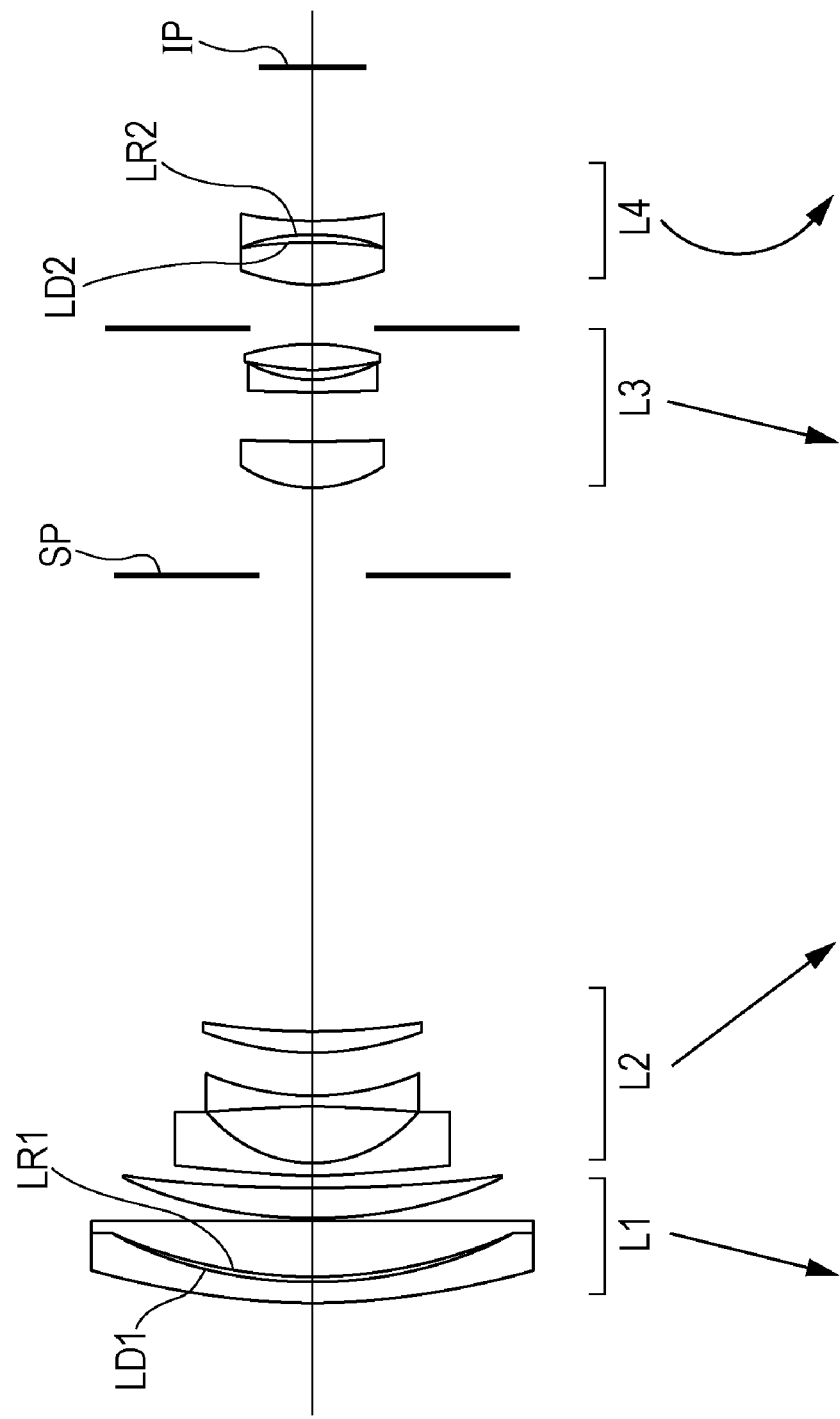

OPTICAL SYSTEM AND OPTICAL APPARATUS INCLUDING THE SAME

This application is a Continuation of International Application No. PCT/JP2009/064793, filed Aug. 25, 2009, which is hereby incorporated by reference herein in its entirety.

TECHNICAL FIELD

The present invention relates to an optical system and an optical apparatus including the optical system, and, is suitable for, for example, silver-halide film cameras, digital still cameras, video cameras, telescopes, binoculars, projectors, and the like.

BACKGROUND ART

In general, an optical system used in image pickup apparatuses, such as a digital camera and a video camera, is required to have a short total lens length (total optical length, length from the first lens surface on the object side to an image plane) and a compact optical system. However, as the total size of the optical system decreases, aberrations, especially chromatic aberration tends to increase and the optical performance tends to degrade. To properly correct chromatic aberration over the visible wavelength range in such an optical system for use in the image pickup apparatus, it is necessary to correct chromatic aberrations of four wavelengths of d-, g-, C-, and F-lines.

As a structure for correcting chromatic aberration, an optical element formed of a low-dispersion optical material and an optical element formed of a high-dispersion optical material are generally used in combination. However, since the high-dispersion optical material has a higher partial dispersion ratio for the g-line and the d-line than that of the low-dispersion optical material, if chromatic aberration between the F-line and the C-line is corrected by this structure, chromatic aberration of the g-line is apt to worsen.

Accordingly, a structure using a diffractive optical element is known as a method for correcting chromatic aberration of the g-line (PTL 1). A diffractive optical element has an anomalous partial dispersibility, has a small value of 0.8918 corresponding to the partial dispersion ratio for the g-line and the d-line, and is therefore effective for correction of chromatic aberration of the g-line. Further, since the absolute value of the value corresponding to the Abbe number is a small value of 3.45, only minute optical power is caused by diffraction, and chromatic aberration can be corrected with little influence on spherical aberration, coma aberration, astigmatism, etc. PTL 1 discloses a telephoto lens in which chromatic aberration is corrected by the use of a diffractive optical element.

In addition, as another structure for correcting chromatic aberration in the visible wavelength range, an optical system that corrects chromatic aberration with a diffractive optical element and a refractive optical element having an anomalous partial dispersibility has been proposed (PTL 2). PTL 2 discloses a zoom lens in which longitudinal chromatic aberration at the telephoto end and lateral chromatic aberration at the wide-angle end are corrected by arranging a diffractive optical element on an object side of an aperture stop and a refractive optical element on an image side of the aperture stop.

However, in the structure using the diffractive optical element as in PTL 1, chromatic aberrations of the d-, g-, C-, and F-lines can be relatively properly corrected, whereas it is difficult to simultaneously correct chromatic aberration of the g-line and chromatic aberration between the F-line and the C-line. This is because chromatic aberration caused in the diffractive optical element changes in proportion to the wavelength. Chromatic aberration caused in the diffractive optical element has a proportional relationship with the wavelength, and the slope of chromatic aberration of the wavelength between the F-line and the C-line is the same as the slope of chromatic aberration of the wavelength between the g-line and the F-line. In contrast, chromatic aberration caused in a general optical material tends to change in a curved manner with respect to the wavelength and to increase the slope of the curve as the wavelength decreases. Hence, the slope of chromatic aberration for the wavelength between the F-line and the C-line is different from the slope of chromatic aberration for the wavelength between the g-line and the F-line. For this reason, when chromatic aberration caused in the general optical material is corrected by the diffractive optical element, if an optical power necessary for correcting chromatic aberration between the g-line and the F-line is given to the diffractive optical element, chromatic aberration between the F-line and the C-line remains. Conversely, when an optical power necessary for correcting chromatic aberration between the F-line and the C-line is given to the diffractive optical element, chromatic aberration between the g-line and the F-line remains. Therefore, when the diffractive optical element is used, it is difficult to simultaneously correct chromatic aberration of the g-line and chromatic aberration between the F-line and the C-line.

The structure in PTL 2 corrects longitudinal chromatic aberration at the telephoto end by the diffractive optical element, and corrects lateral chromatic aberration at the wide-angle end by the refractive optical element. However, PTL 2 does not disclose a structure for properly correcting chromatic aberrations of the d-, g-, C-, and F-lines.

Accordingly, the present invention provides an optical element and an optical apparatus that can properly correct chromatic aberration over the entire visible wavelength range.

CITATION LIST

Patent Literature

PTL 1: Japanese Patent Laid-Open No. 06-324262
PTL 2: Japanese Patent Laid-Open No. 2008-151846

SUMMARY OF INVENTION

As means for solving the above-described problems, an optical system of the present invention includes a diffractive optical element and a refractive optical element on at least one of an object side and an image side of an aperture stop. The following conditions are satisfied:

$$|\Delta\theta_{gd}| > 0.038 \tag{1}$$

$$0.003 < |\delta\theta_{dC}| < 0.038 \tag{2}$$

$$(\Phi_R \times v_d \times \delta\theta_{dC}) \times (-\Phi_D) < 0 \tag{3}$$

where $v_d$ represents an Abbe number of the refractive optical element, $\theta_{gd}$ represents a partial dispersion ratio for a g-line and a d-line, $\theta_{dC}$ represents a partial dispersion ratio for the d-line and a C-line, $\Phi_R$ represents an optical power provided when light incident and exit surfaces of the refractive optical element are both in contact with air, and $\Phi_D$ represents an optical power of the diffractive optical element.

Here, $\Delta\theta_{gd} = \theta_{gd} - (-1.687 \times 10^{-7} \cdot v_d^3 + 5.702 \times 10^{-5} \cdot v_d^2 - 6.603 \times 10^{-3} \cdot v_d + 1.462)$ and $\delta\theta_{dc} = \theta_{dc} - (-0.1968\theta_{gd} + 0.5480)$.

Further features of the present invention will become apparent from the following description of exemplary embodiments with reference to the attached drawings.

BRIEF DESCRIPTION OF DRAWINGS

FIG. 9 is a cross-sectional view of an optical system according to a fifth numerical example.

DESCRIPTION OF EMBODIMENTS

Figure 1:
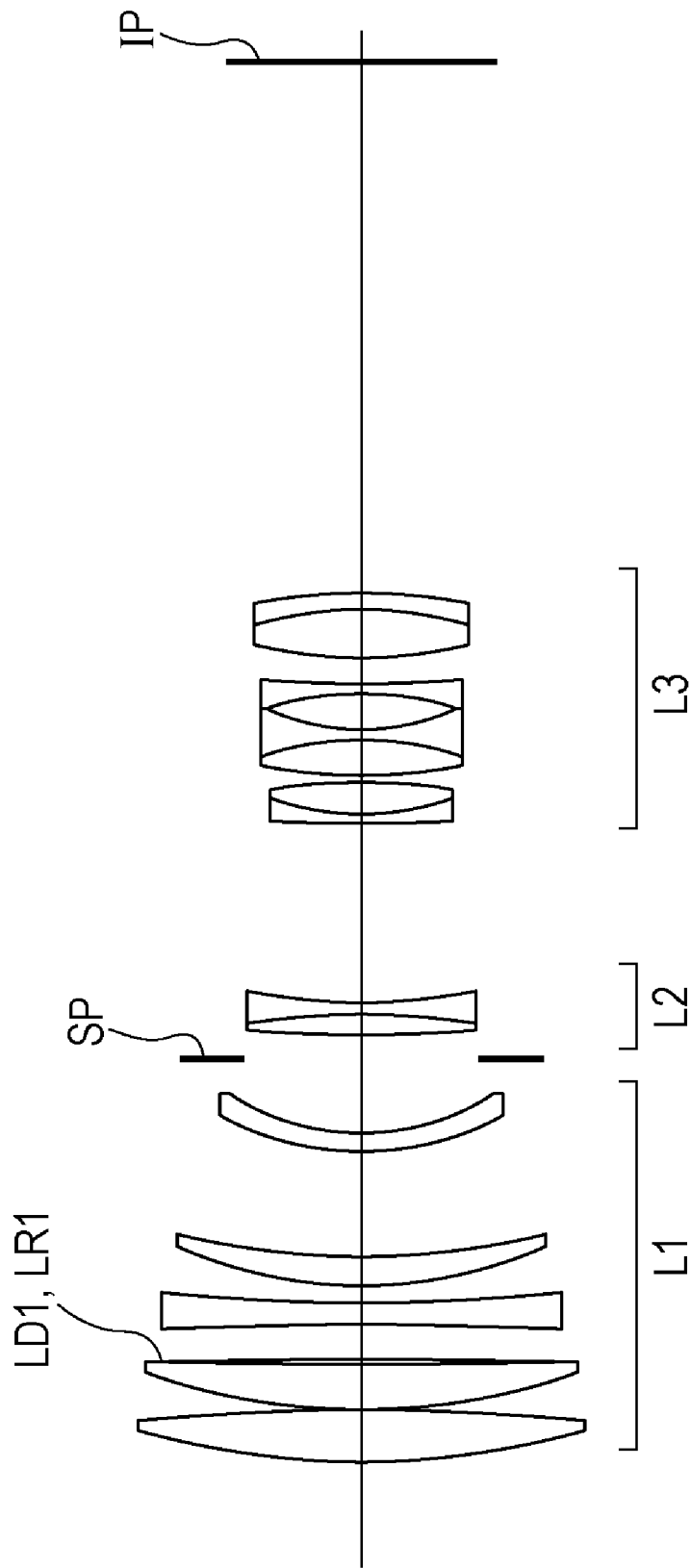
FIG. 1 is a cross-sectional view of an optical system according to a first numerical example.

An optical system of the present invention includes, on at least one of an object side and an image side of an aperture stop, a diffractive optical element LD and a refractive optical element LR that satisfies Conditional Expressions (1) and (2). In the present invention, chromatic aberration between the F-line and the C-line, which worsens when chromatic aberration of the g-line is corrected by the diffractive optical element LD, is corrected by the refractive optical element LR by properly combining the diffractive optical element LD and the refractive optical element LR so as to satisfy Conditional Expression (3). This makes it possible to simultaneously remove chromatic aberration of the g-line and chromatic aberration between the F-line and the C-line, and to obtain an optical element and an optical apparatus properly corrected for chromatic aberration over the entire visible wavelength range.

Next, the conditional expressions of the present invention will be described in more detail.

The optical system of the present invention includes the diffractive optical element LD and the refractive optical element LR on at least one of the object side and the image side of the aperture stop. An Abbe number of the refractive optical element LR is designated as $v_d$, a partial dispersion ratio relating to the g-line and the d-line is designated as $\theta_{gd}$, and a partial dispersion ratio relating to the d-line and the C-line is designated as $\theta_{dC}$. When an optical power provided when light incident and exit surfaces of the refractive optical element LR are both in contact with air is designated as $\Phi_R$ and an optical power of the diffractive optical element is designated as $\Phi_D$, the optical system of the present invention satisfies Expressions (1) to (3).

$$|\Delta\theta_{gd}| > 0.038 \quad (1)$$

$$0.003 < |\delta\theta_{dC}| < 0.038 \quad (2)$$

$$(\Phi_R \times v_{dR} \times \delta\theta_{dC}) \times (-\Phi_D) < 0 \quad (3)$$

Here, $\Delta\theta_{gd}$ and $\delta\theta_{dC}$ are defined as follows:

$$\Delta\theta_{gd} = \theta_{gd} - (-1.687 \times 10^{-7} \cdot v_d^3 + 5.702 \times 10^{-5} \cdot v_d^2 - 6.603 \times 10^{-3} \cdot v_d + 1.462) \quad (4)$$

$$\delta\theta_{dC} = \theta_{dC} - (-0.1968\theta_{gd} + 0.5480) \quad (5)$$

Here, the Abbe number and the partial dispersion ratio of the optical element used in the optical system of the embodiment are as follows. Refractive indices for the g-line (435.83 nm), the F-line (486.13 nm), the d-line (587.56 nm), and the C-line (656.27 nm) in Fraunhofer lines are designated as $N_g$, $N_F$, $N_d$, and $N_C$, respectively. In this case, the Abbe number $v_d$, the partial dispersion ratio $\theta_{gd}$ relating to the g-line and the d-line, and the partial dispersion ratio $\theta_{dC}$ relating to the d-line and the C-line are defined by the following Expressions.

$$v_d = (N_d - 1)/(N_F - N_C) \quad (6)$$

$$\theta_{gd} = (N_g - N_d)/(N_F - N_C) \quad (7)$$

$$\theta_{dC} = (N_d - N_C)/(N_F - N_C) \quad (8)$$

Further, the optical power is defined by the reciprocal of the focal length, and is a value that is synonymous with the refractive power in the case of a refractive optical element.

Expression (1) specifies an anomalous partial dispersibility of the refractive optical element LR. In Expression (4) for defining $\Delta\theta_{gd}$, $(-1.687 \times 10^{-7} \cdot v_d^3 + 5.702 \times 10^{-5} \cdot v_d^2 - 6.603 \times 10^{-3} \cdot v_d + 1.462)$ is an expression showing the relationship between $v_d$ and $\theta_{gd}$ of a general glass material. That is, Expression (1) shows the difference between $\theta_{gd}$ of the refractive optical element LR of the present invention and $\theta_{gd}$ of the general glass material.

When Expression (1) is satisfied, chromatic aberration of the g-line can be properly corrected with the refractive optical element LR. In contrast, when Expression (1) is not satisfied, the anomalous partial dispersibility becomes weak, and it is therefore difficult to properly correct chromatic aberration of the g-line with the refractive optical element LR.

Expression (2) specifies the optical characteristic of the refractive optical element LR having anomalous partial dispersibility needed to simultaneously remove chromatic aberration of the g-line and chromatic aberration between the F-line and the C-line when the refractive optical element LR is used together with the diffractive optical element LD.

When Expression (2) is satisfied, chromatic aberration of the g-line and chromatic aberration between the F-line and the C-line can be simultaneously removed in a case in which the refractive optical element LR is used together with the diffractive optical element LD in the optical system. For this reason, it is possible to properly correct chromatic aberration over the entire visible wavelength range.

When the value falls below the lower limit in Expression (2), even if the refractive optical element LR is used together with the diffractive optical element LD in the optical system, it is difficult to simultaneously remove chromatic aberration of the g-line and chromatic aberration between the F-line and the C-line. In this case, the optical power of the diffractive optical element LD decreases, and the optical power of the refractive optical element LR increases. As the optical power of the refractive optical element LR increases, the thickness of the element increases. When the refractive optical element LR is formed of resin or a mixture in which inorganic microparticles are dispersed in a transparent medium, if the thickness of the element increases, molding is difficult. Particularly when the above-described inorganic microparticles are indium-tin oxide (ITO) microparticles, if the thickness of the element increases, transmittance decreases. Further, when the thickness of the element increases, refractive index and shape of the element are easy to become affect by temperature and humidity.

In contrast, when the value exceeds the upper limit in Expression (2), the optical power of the diffractive optical element LD increases, and the optical power of the refractive optical element LR decreases. When the optical power of the diffractive optical element LD increases, the pitch of the diffraction grating decreases. When the pitch decreases, production is difficult, and a flare spot is caused by unnecessary diffracted light.

A mixture in which inorganic oxide microparticles are dispersed in synthetic resin is an optical material that satisfies Expressions (1) and (2). As examples of inorganic oxides, $TiO_2$ (Nd=2.304, vd=13.8) and ITO (Nd=1.8571, vd=5.69) are given. When these inorganic oxide microparticles are dispersed in the synthetic resin at a proper volume ratio, an optical material that satisfies Expressions (1) and (2) is obtained. The optical material is not limited to these as long as it satisfies Expressions (1) and (2).

Expression (3) is a conditional expression such that chromatic aberration between the F-line and the C-line, which worsens when chromatic aberration of the g-line is removed by the diffractive optical element LD, is cancelled by chromatic aberration between the F-line and the C-line that worsens when chromatic aberration of the g-line is removed by the refractive optical element LR.

As for a chromatic aberration coefficient between the d-line and the C-line (F-line and d-line) provided when chromatic aberration coefficients between the F-line and the C-line are made the same and a chromatic aberration coefficient of the g-line is corrected, a coefficient of longitudinal chromatic aberration is expressed by $\phi\delta\theta_{dC}h^2/v_d$, and a coefficient of lateral chromatic aberration is expressed by $\phi\delta\theta_{d-}chH/v_d$. Here, $\phi$ represents the optical power of the optical element, h represents the height of paraxial marginal ray incident on the pupil optical element, and H represents the height of pupil paraxial off-axis ray incident on the optical element. In Expression (5) for defining $\delta\theta_{dC}$, $(-0.1968\theta_{gd}+0.5480)$ is an expression that shows the relationship between $\theta_{dC}$ and $\theta_{gd}$ of the general glass material. That is, $\Delta\theta_{dC}$ represents the difference between $\theta_{dC}$ of the refractive optical element LR of the present invention and $\theta_{dC}$ of the general glass material. A condition that longitudinal chromatic aberration between the F-line and the C-line is cancelled by the refractive optical element LR and the diffractive optical element LD is such that the product of the coefficient of longitudinal chromatic aberration in the refractive optical element LR and the coefficient of longitudinal chromatic aberration in the diffractive optical element LD is a negative value. Similarly, a condition of lateral chromatic aberration is such that the product of the coefficient of lateral chromatic aberration in the refractive optical element LR and the coefficient of lateral chromatic aberration in the diffractive optical element LD is a negative value.

Since the refractive optical element LR and the diffractive optical element LD are both provided on the object side or image side of the aperture stop, the products of the chromatic aberration coefficients have the same sign between longitudinal chromatic aberration and lateral chromatic aberration. Further, since the conditions that $\delta\theta_{dC}>0$ and $v_d<0$ can be defined in the diffractive optical element LD, a conditional expression for cancelling chromatic aberration between the F-line and the C-line is expressed by Expression (3).

When Expression (3) is satisfied, it is possible to simultaneously remove chromatic aberration of the g-line and chromatic aberration between the F-line and the C-line for both longitudinal chromatic aberration and lateral chromatic aberration, and to properly correct chromatic aberration over the entire visible wavelength range. In contrast, when Expression (3) is not satisfied, even if chromatic aberration of the g-line is removed, chromatic aberration between the F-line and the C-line worsens in the same direction between the refractive optical element LR and the diffractive optical element LD. Therefore, chromatic aberration cannot be properly corrected over the entire visible wavelength range.

In this way, in the present invention, a chromatic aberration component of the g-line and chromatic aberration between the F-line and the C-line can be simultaneously corrected by satisfying Expressions (1) to (3) in the optical system in which the refractive optical element LR and the diffractive optical element LD are both arranged on the object side or image side of the aperture stop. For this reason, chromatic aberration can be properly corrected over the entire visible wavelength range.

In carrying out the present invention, it is preferable to satisfy the following Expressions (9) to (11).

Expression (9) is a conditional expression such that the diffractive optical element LD and the refractive optical element LR both correct chromatic aberration of the g-line.

$$(\Phi_R \times v_d \times \Delta\theta_{gd}) \times \Phi_D > 0 \tag{9}$$

When Expression (9) is satisfied, the optical powers of the diffractive optical element LD and the refractive optical element LR can be reduced. The pitch of the diffraction grating increases when the optical power of the diffractive optical element LD decreases, and the thickness of the element decreases when the optical power of the refractive optical element LR decreases. In contrast, in a case in which Expression (9) is not satisfied, when chromatic aberration of the g-line is removed, the optical powers of the diffractive optical element LD and the refractive optical element LR increase. The pitch of the diffraction grating decreases when the optical power of the diffractive optical element LD increases, and the thickness of the element increases when the optical power of the refractive optical element LR increases.

Expression (10) specifies the Abbe number of the refractive optical element LR:

$$v_d < 60 \tag{10}$$

When Expression (10) is satisfied, chromatic aberration can be independently and easily corrected without having any influence on aberrations such as spherical aberration, coma aberration, and astigmatism. By setting the numerical range in Expression (10) as follows, chromatic aberration can be corrected more properly.

$$v_d < 30 \tag{10a}$$

Expression (11) specifies the ratio of the optical power $\Phi_D$ of the diffractive optical element LD and the optical power $\Phi_R$ of the refractive optical element LR.

$$\Phi_D/\Phi_R < 0.4 \tag{11}$$

By satisfying Expression (11), chromatic aberration can be properly corrected over the visible wavelength range. In contrast, when Expression (11) is not satisfied, chromatic aberration between the F-line and the C-line, which is caused when removing chromatic aberration of the g-line by the diffractive optical element LD, increases, and is not easily cancelled by chromatic aberration caused between the F-line and the C-line when removing the chromatic aberration of the g-line by the refractive optical element LR.

In the present invention, the diffractive optical element LD and the refractive optical element LR are preferably provided in the same lens unit. This can optimize the ratio of the optical powers of the diffractive optical element LD and the refractive optical element LR, and can properly correct longitudinal chromatic aberration and lateral chromatic aberration. In this case, the diffractive optical element LD and the refractive optical element LR may be joined to each other.

Next, embodiments of the present invention will be described with reference to the drawings.

FIGS. 1, 3, 5, 7, and 9 are schematic cross-sectional views respectively illustrating optical systems according to first to fifth embodiments, and FIGS. 2, 4, 6, 8, and 10 are aberration diagrams of the optical systems of the first to fifth embodiments. FIGS. 10A to 10C are aberration diagrams of the optical systems, respectively, at a short focal length, an intermediate focal length, and a long focal length. The aberration diagrams are for first to fifth numerical examples, which will be described below, corresponding to the first to fifth embodiments.

In the schematic cross-sectional views, SP represents an aperture stop, and IP represents an image plane. Further, L1, L2, L3, and L4 respectively represent a first lens unit, a second lens unit, a third lens unit, and a fourth lens unit, LD1 and LD2 represent diffractive optical elements, and LR1 and LR2 represent refractive optical elements.

In the aberration diagrams, d, g, C, and F respectively represent the d-, g-, F-, and C-lines. Further, in astigmatism, ΔS represents a sagittal ray of the d-line, and ΔM represents a meridional ray of the d-line. Fno represents the f-number, and ω represents the half angle of view.

The embodiments will be described in more detail below.

First Embodiment

Figure 2:
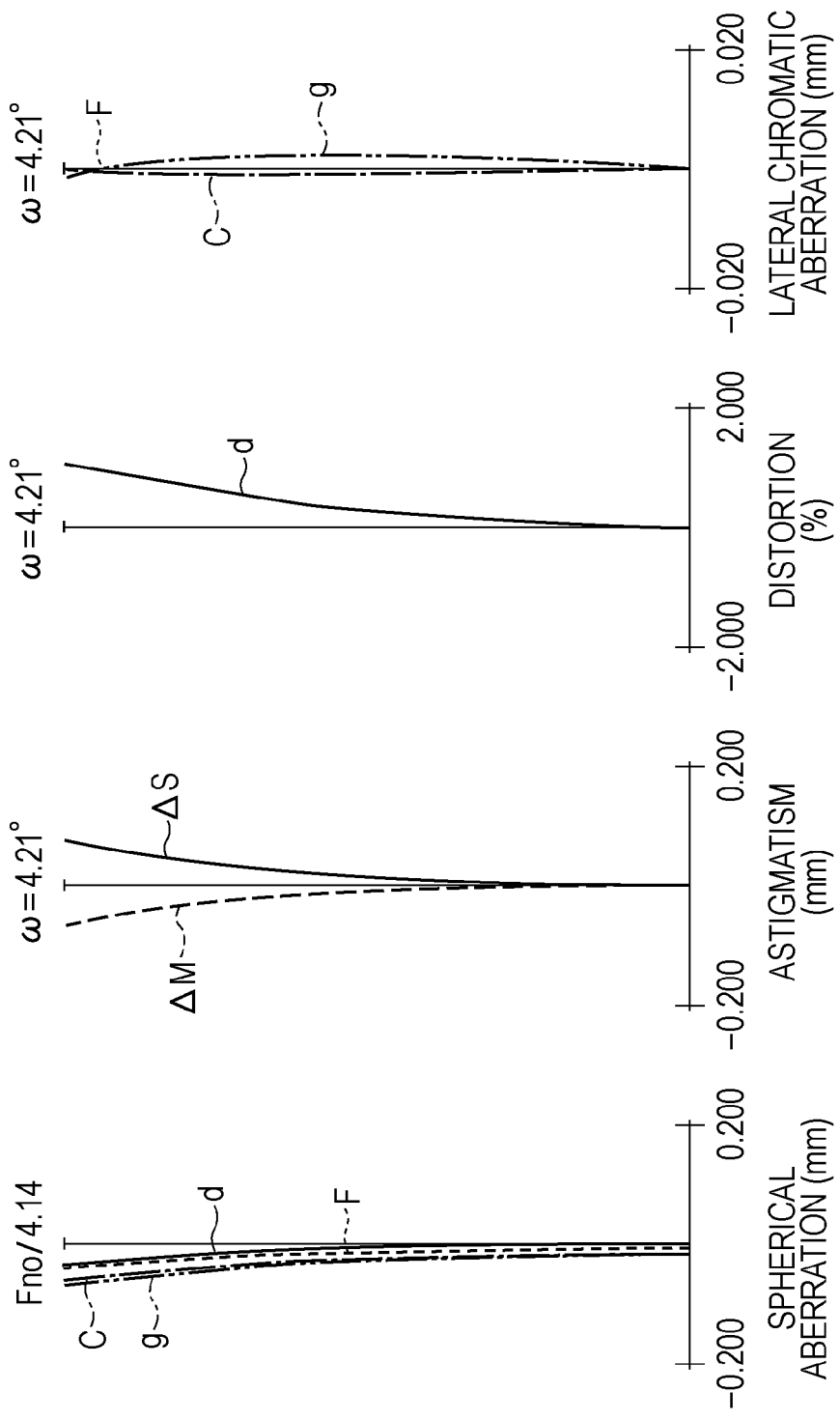
FIG. 2 includes aberration diagrams of the optical system of the first numerical example in a state in which an object at infinity is in focus.

The optical system of the first embodiment is a telephoto lens including a first lens unit L1 having a positive refractive power, a second lens unit L2 having a negative refractive power, and a third lens unit L3 having a negative refractive power, as shown in FIG. 1. Focusing is performed by moving the second lens unit L2 to an image plane side. In this embodiment, a mixture in which $TiO_2$ microparticles are dispersed in a transparent medium is used as a refractive optical element LR1 that satisfies Expressions (1) and (2). A diffractive optical element LD1 and the refractive optical element LR1 are provided on the object side of the aperture stop in a manner such as to be in close contact with each other. The diffractive optical element LD1 and the refractive optical element LR1 are provided with appropriate optical powers so as to satisfy Expression (3). This makes it possible to obtain a compact telephoto lens that is properly corrected for longitudinal chromatic aberration and lateral chromatic aberration over the entire visible wavelength range, as shown in FIG. 2.

Second Embodiment

Figure 3:
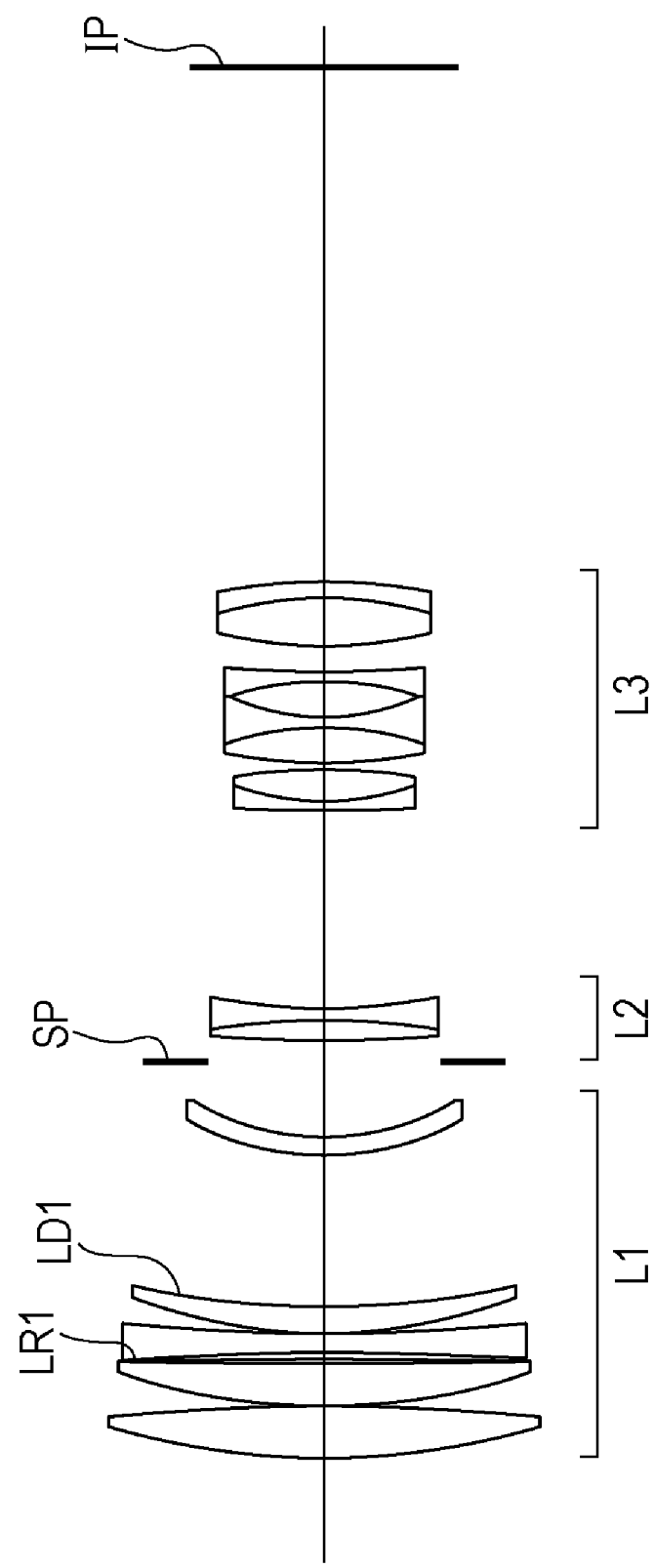
FIG. 3 is a cross-sectional view of an optical system according to a second numerical example.
Figure 4:
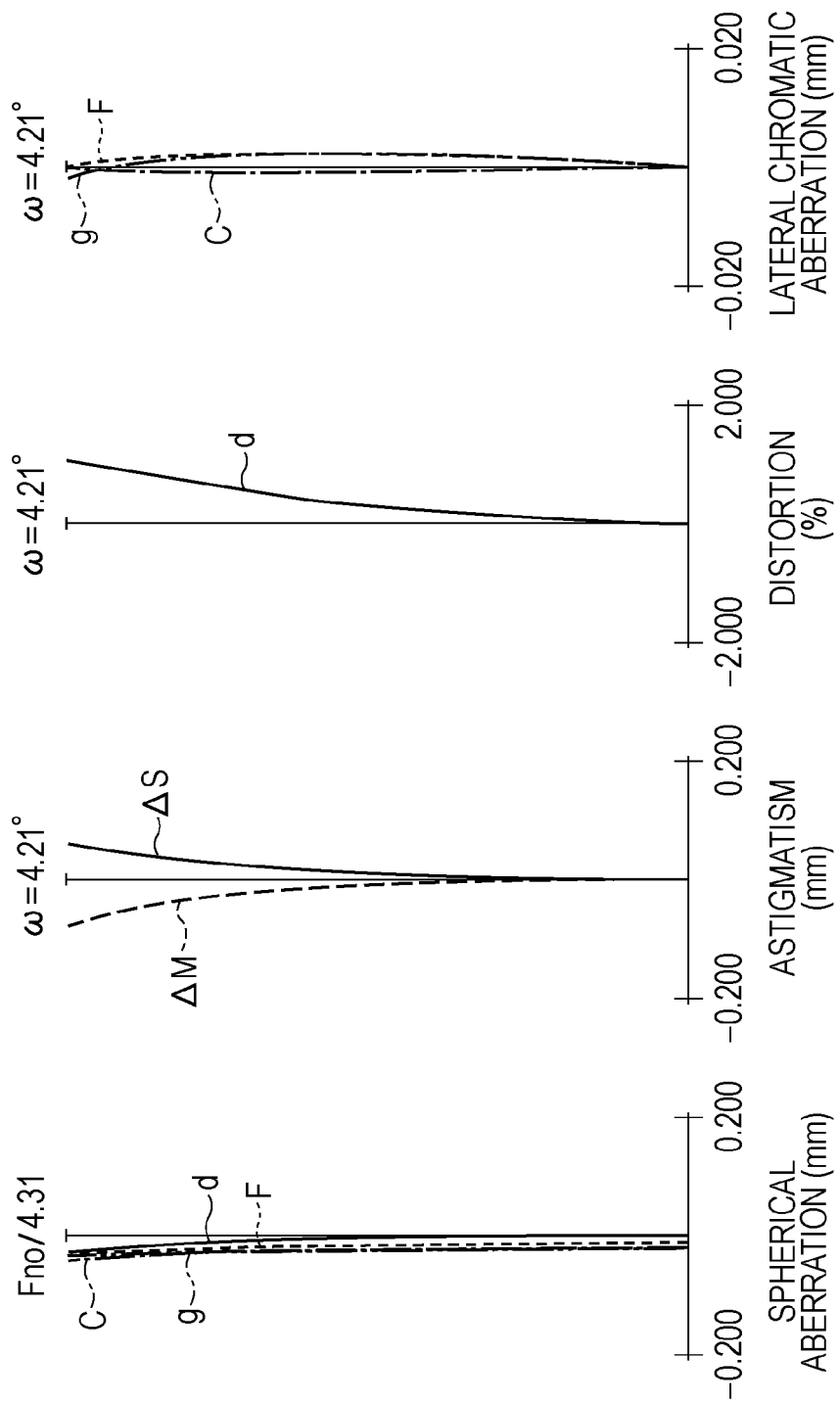
FIG. 4 includes aberration diagrams of the optical system of the second numerical example in a state in which an object at infinity is in focus.

The optical system of the second embodiment is a telephoto lens including a first lens unit L1 having a positive refractive power, a second lens unit L2 having a negative refractive power, and a third lens unit L3 having a negative refractive power, as shown in FIG. 3. Focusing is performed by moving the second lens unit L2 to the image plane side. In this embodiment, a mixture in which $TiO_2$ microparticles are dispersed in a transparent medium is used as a refractive optical element LR1 that satisfies Expressions (1) and (2). A diffractive optical element LD1 and the refractive optical element LR1 are separately provided on the object side of the aperture stop. The diffractive optical element LD1 and the refractive optical element LR1 are provided with appropriate optical powers so as to satisfy Expression (3). This makes it possible to obtain a compact telephoto lens that is properly corrected for longitudinal chromatic aberration and lateral chromatic aberration over the entire visible wavelength range, as shown in FIG. 4.

Third Embodiment

Figure 5:
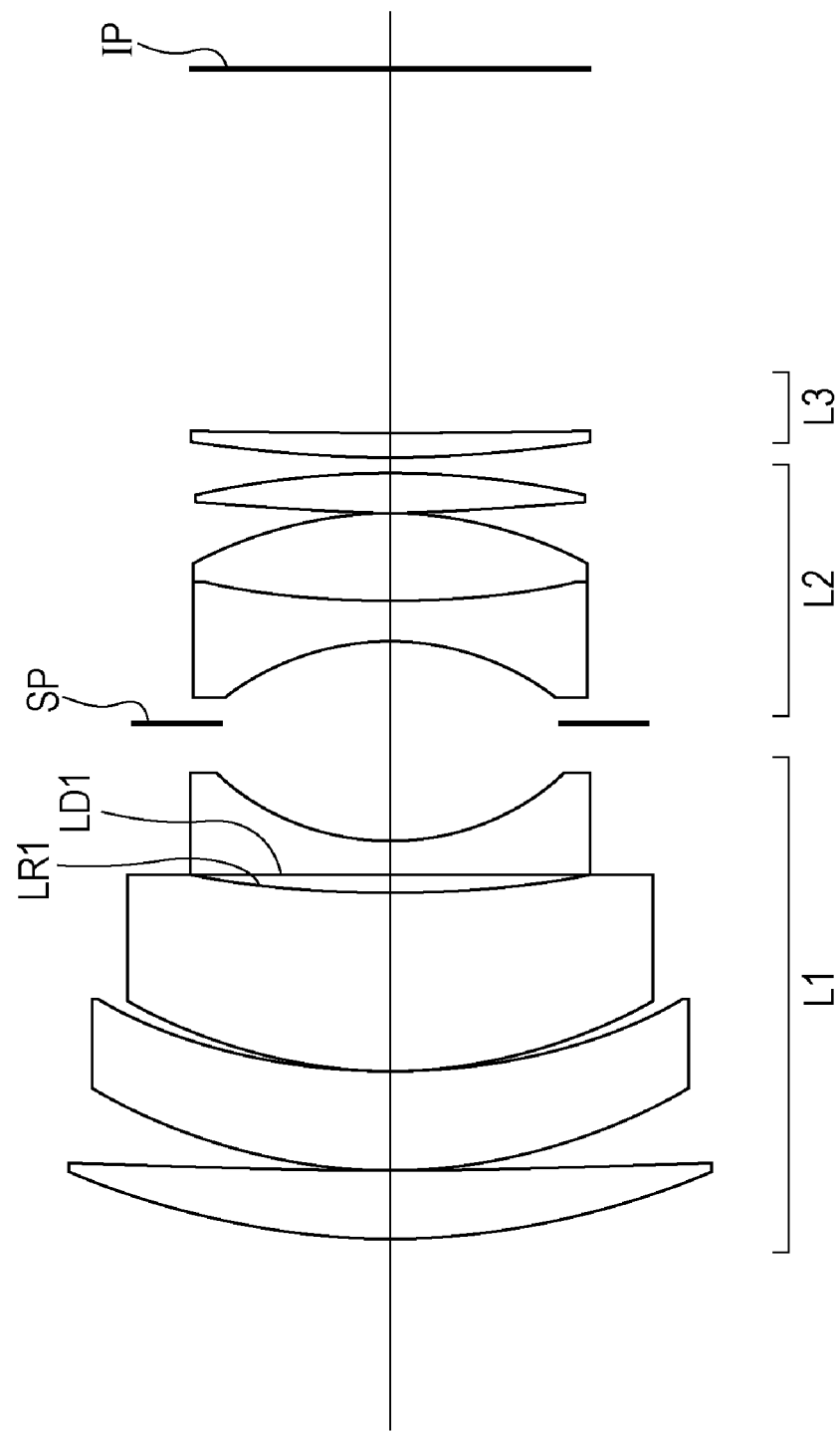
FIG. 5 is a cross-sectional view of an optical system according to a third numerical example.
Figure 6:
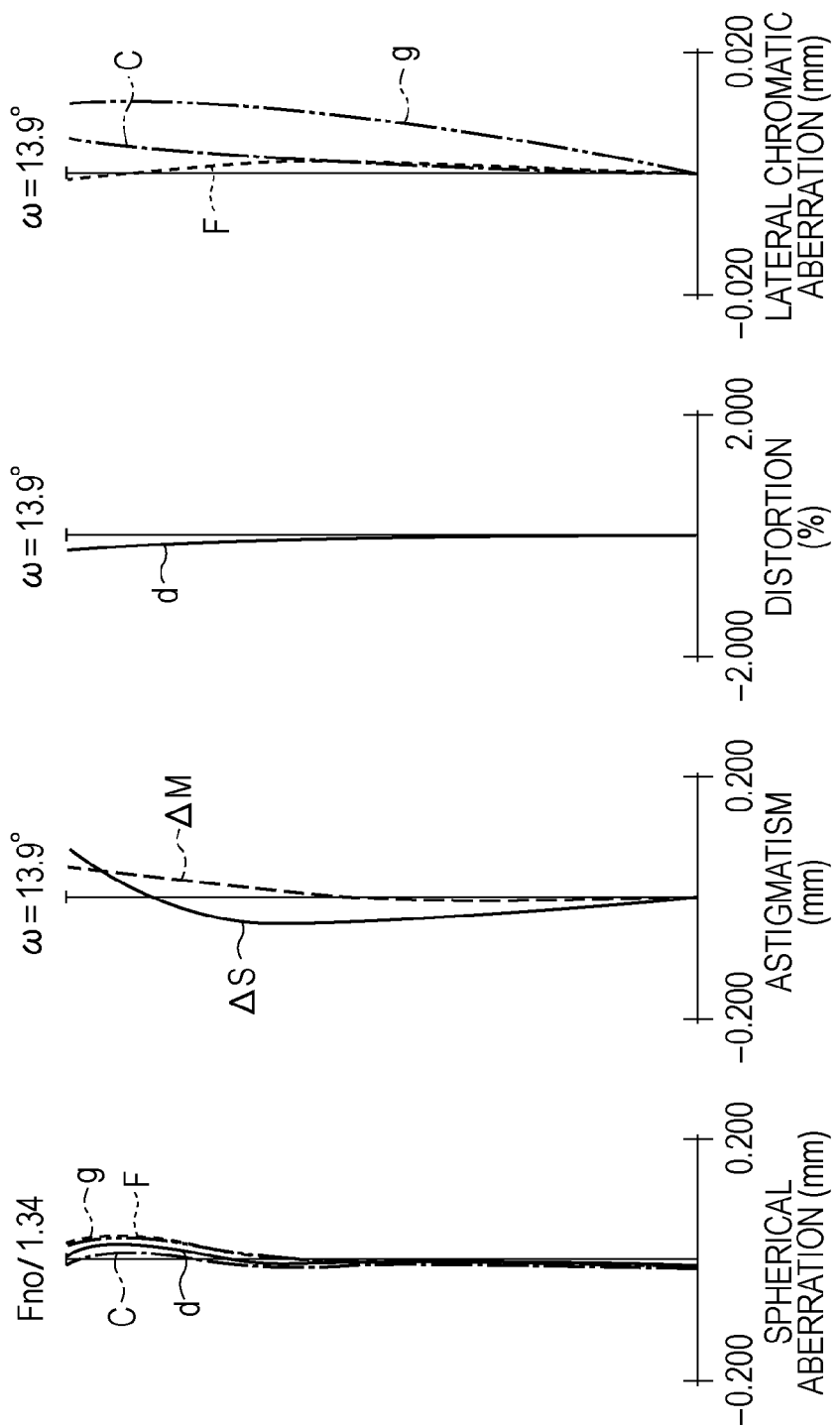
FIG. 6 includes aberration diagrams of the optical system of the third numerical example in a state in which an object at infinity is in focus.

The optical system of the third embodiment is an intermediate telephoto lens including a first lens unit L1 having a positive refractive power, a second lens unit L2 having a negative refractive power, and a third lens unit L3 having a positive refractive power, as shown in FIG. 5. Focusing is performed by moving the third lens unit L3 to the image plane side. In this embodiment, a mixture in which $TiO_2$ microparticles are dispersed in a transparent medium is used as a refractive optical element LR1 that satisfies Expressions (1) and (2). A diffractive optical element LD1 and the refractive optical element LR1 are provided on the object side of the aperture stop in a manner such as to be in close contact with each other. The diffractive optical element LD1 and the refractive optical element LR1 are provided with appropriate optical powers so as to satisfy Expression (3). This properly corrects longitudinal chromatic aberration over the entire visible wavelength range, as shown in FIG. 6.

Fourth Embodiment

Figure 7:
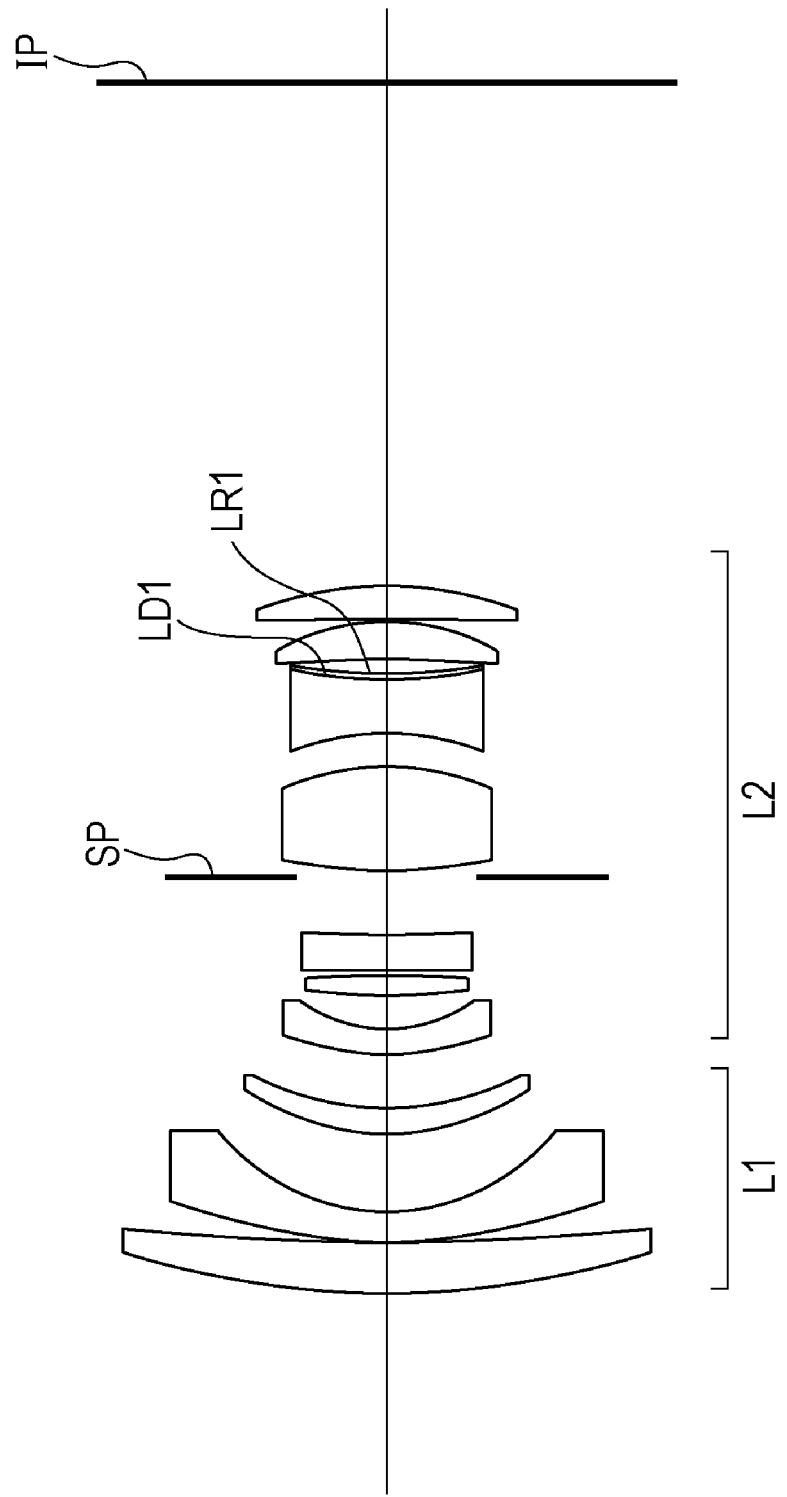
FIG. 7 is a cross-sectional view of an optical system according to a fourth numerical example.
Figure 8:
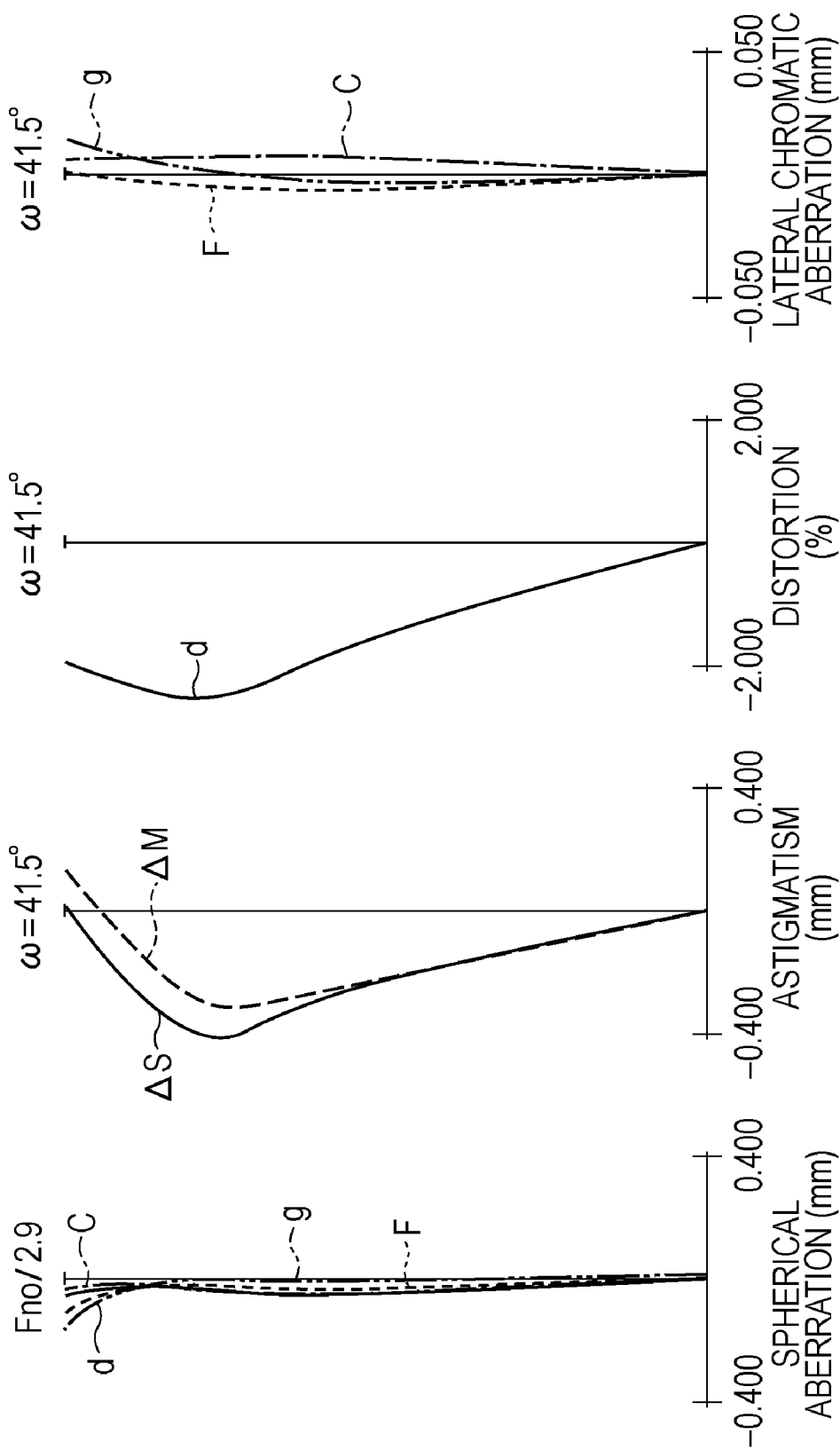
FIG. 8 includes aberration diagrams of the optical system of the fourth numerical example in a state in which an object at infinity is in focus.

The optical system of the fourth embodiment is a wide angle lens including a first lens unit L1 having a positive refractive power and a second lens unit L2 having a negative refractive power, as shown in FIG. 7. Focusing is performed by moving the second lens unit L2 to the image plane side. In this embodiment, a mixture in which $TiO_2$ microparticles are dispersed in a transparent medium is used as a refractive optical element LR1 that satisfies Expressions (1) and (2). A diffractive optical element LD1 and the refractive optical element LR1 are provided on the image side of the aperture stop in a manner such as to be in close contact with each other. By providing the diffractive optical element LD1 and the refractive optical element LR1 with appropriate optical powers so as to satisfy Expression (3), chromatic aberration is properly corrected over the entire visible wavelength range, as shown in FIG. 8.

Fifth Embodiment

Figure 10A:
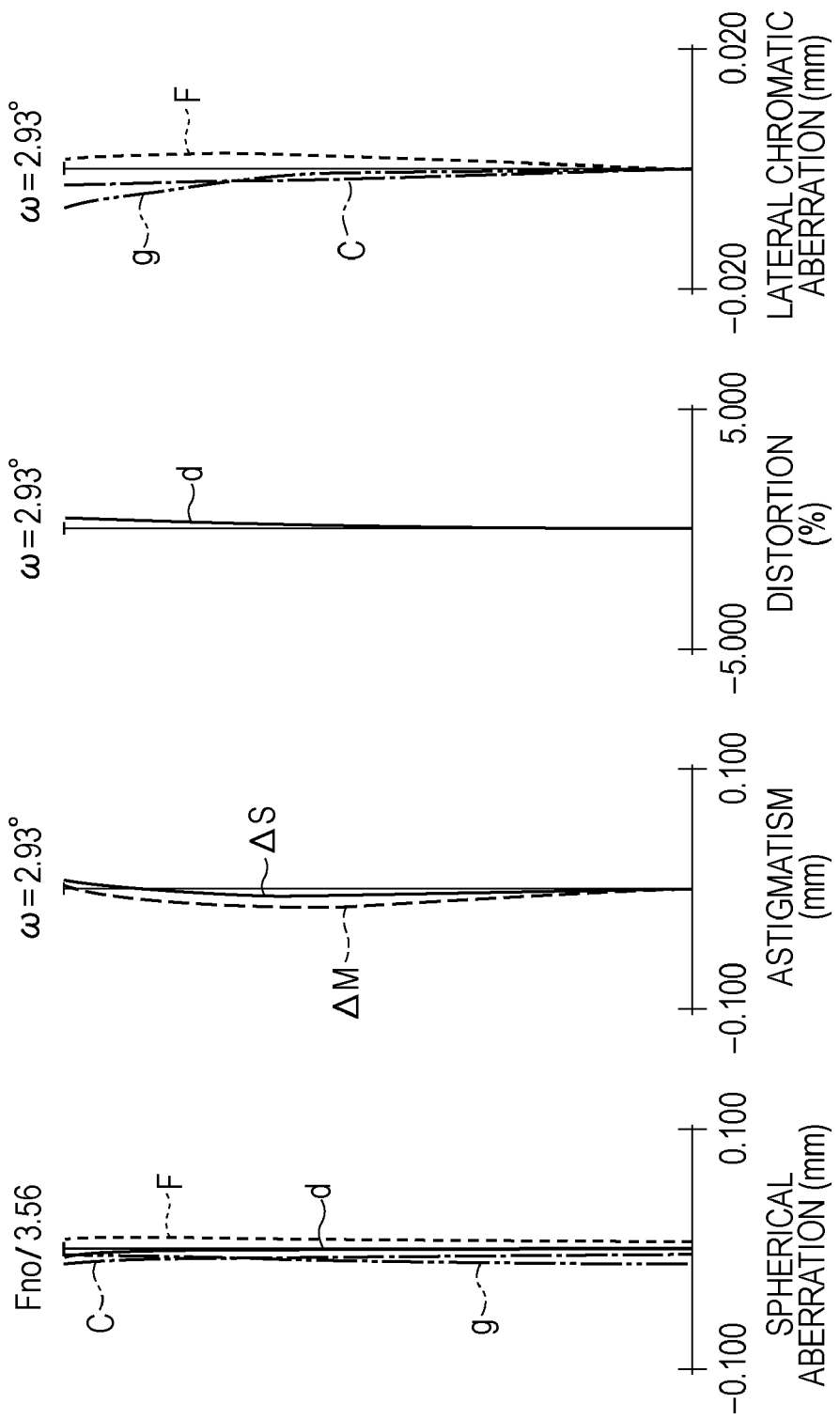
FIG. 10A includes aberration diagrams of the optical system of the fifth numerical example.
Figure 10B:
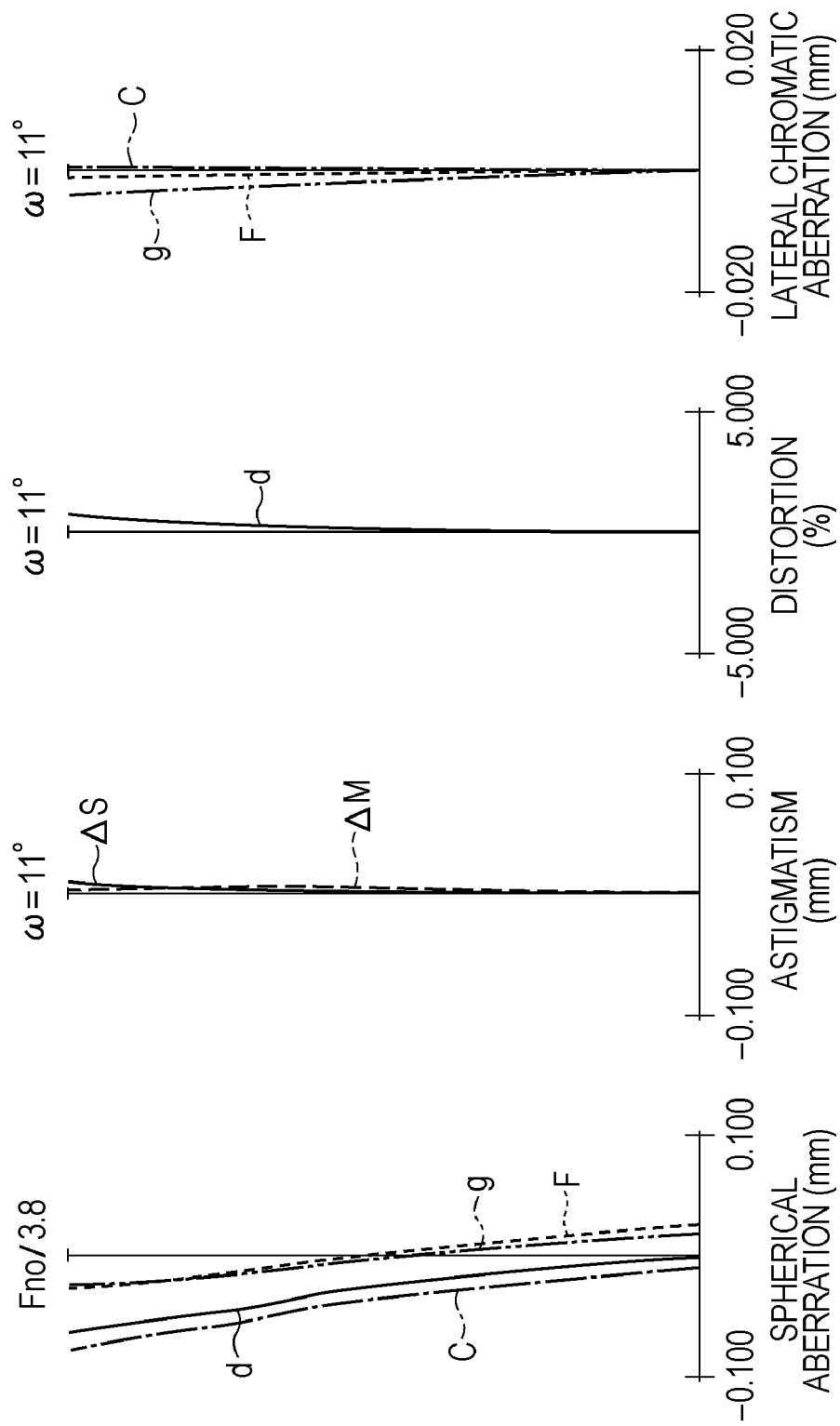
FIG. 10B includes aberration diagrams of the optical system of the fifth numerical example.
Figure 10C:
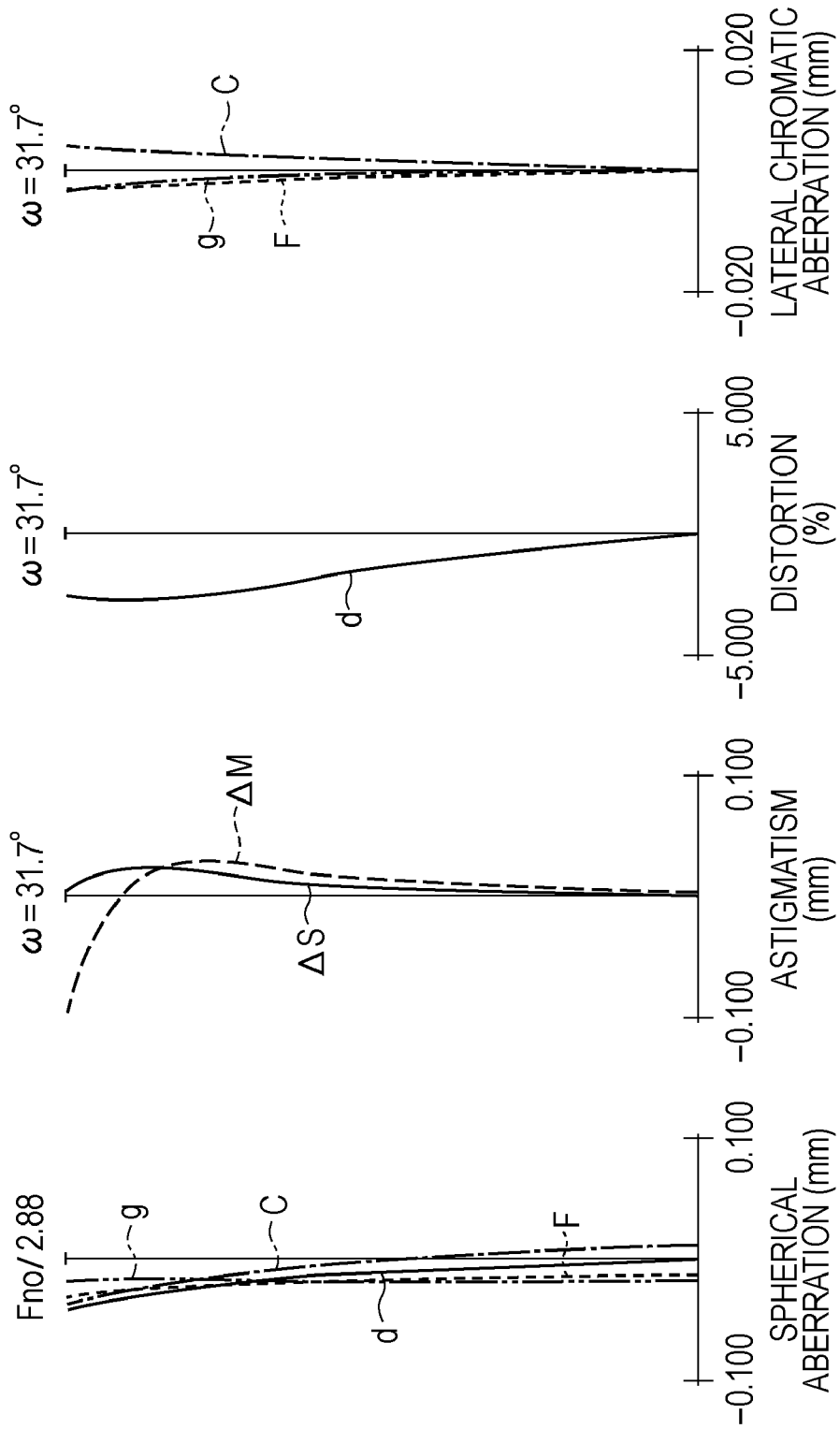
FIG. 10C includes aberration diagrams of the optical system of the fifth numerical example.

The optical system of the fifth embodiment is a zoom lens including a first lens unit L1 having a positive refractive power, a second lens unit L2 having a negative refractive power, a third lens unit L3 having a positive refractive power, and a fourth lens unit L4 having a positive refractive power, as shown in FIG. 9. In FIG. 9, arrows indicate moving paths of the lens units during zooming from the wide-angle end to the telephoto end. In this embodiment, a diffractive optical element LD1 and a refractive optical element LR1 are provided on the object side of the aperture stop, and a diffractive optical element LD2 and a refractive optical element LR2 are provided on the image side of the aperture stop. A mixture in which TiO₂ microparticles are dispersed in a transparent medium is used for the refractive optical elements LR1 and LR2, so that Expressions (1) and (2) are satisfied. The diffractive optical element LD1 and the refractive optical element LR1 on the object side of the aperture stop are provided with appropriate optical powers so as to satisfy Expression (3). This properly corrects particularly longitudinal chromatic aberration at the telephoto end over the visible wavelength range, as shown in FIG. 10C. Further, the diffractive optical element LD2 and the refractive optical element LR2 on the image side of the aperture stop are provided with appropriate optical powers so as to satisfy Expression (3). This properly corrects particularly lateral chromatic aberration at the wide-angle end over the entire visible wavelength range, as shown in FIG. 10A.

Comparative Example

Figure 11:
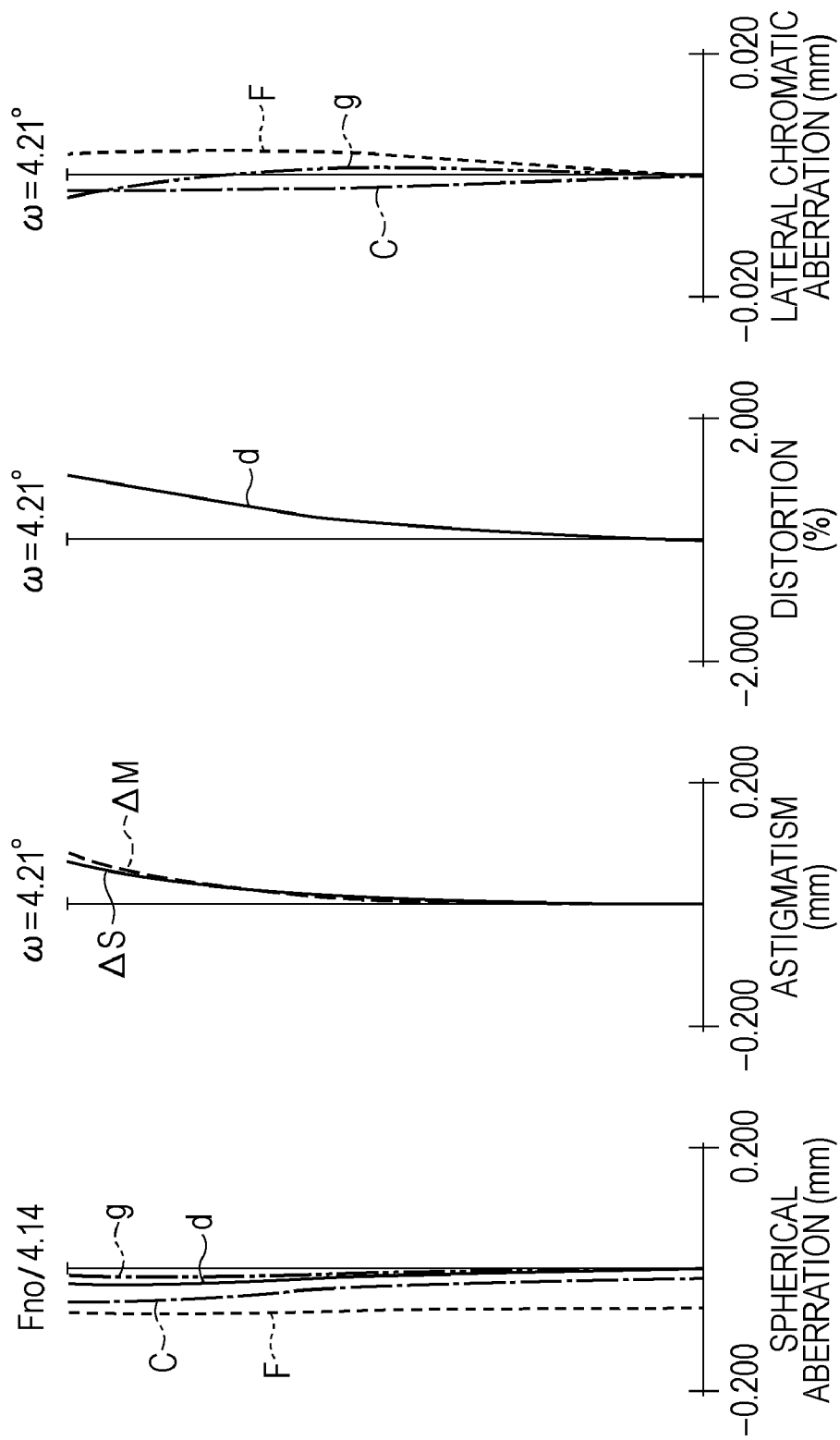
FIG. 11 includes aberration diagrams of a comparative example.

FIG. 11 includes aberration diagrams during focusing on an object at infinity of an optical system that has the same specifications as those of the first embodiment and that is designed to correct chromatic aberration only with a diffractive optical element LD. While chromatic aberration is corrected as a whole by using the diffractive optical element LD, it is difficult to simultaneously correct a chromatic aberration component of the g-line and chromatic aberration between the F-line and the C-line, so that chromatic aberration of the F-line remains.

Numerical data on the first to fifth numerical examples are given below. In the numerical examples, j represents the surface number counted from the object side, $R_j$ represents the radius of curvature of the j-th surface number, $D_j$ represents the surface distance on the optical axis between the j-th surface and the j+1-th surface, and $N_j$ and $v_j$ respectively represent the refractive index and the Abbe number of the j-th optical material for the d-line. Further, f represents the focal length of the optical system, Fno represents the f-number, and ω represents the half angle of view.

The phase shape ψ of the diffractive optical surface in the examples is given by the following equation where m represents the diffraction order number of diffracted light, $λ_0$ represents the designed wavelength, h represents the height from the optical axis in the vertical direction, and $C_i$ (i=1, 2, 3, ...) is a phase coefficient.

[Math. 1]

$$\psi(h \cdot m) = (2\pi/m\lambda_0)*(C_1 h^2 + C_2 h^4 + C_3 h^6 + \ldots) \quad (12)$$

In this case, the optical power ΦD is given by the following expression using a second-order phase coefficient $C_1$.

$$\Phi_D = -2C_1 \quad (13)$$

Further, the aspherical surface shape is given by the following expression where X represents the displacement amount from the vertex of the surface in the optical axis direction, h (mm) represents the height from the optical axis in the direction perpendicular to the optical axis, r (mm) represents the paraxial radius of curvature, k is a conic constant, and B, C, D, E, ... are aspherical coefficients.

[Math. 2]

$$X(h) = \frac{(1/r)h^2}{1 + \sqrt{1 - (1+k)(h/r)^2}} + Bh^4 + Ch^6 + Dh^8 + Eh^{10} + \ldots \quad (14)$$

In the phase coefficients and the aspherical coefficients, "E±XX" means "×10^±XX".

Table 1 shows material characteristics of the refractive optical elements LR used in the embodiments, and Table 2 shows values of the above conditional expressions in the numerical examples.

(First Numerical Example)
f = 294.0 (mm) Fno = 4.14 2ω = 8.42°

| j | Rj | Dj | Nj | vj |
|---|---|---|---|---|
| 1 | 131.4134 | 8.40 | 1.48749 | 70.26 |
| 2 | −362.0158 | 0.15 | 1.00000 | |
| 3 | 105.6300 | 7.24 | 1.48749 | 70.26 |
| 4 | 1575.6344 (LD1) | 0.51 | 1.70877 | 21.63 (LR1) |
| 5 | −325820.0000 | 6.03 | 1.00000 | |
| 6 | −569.9869 | 3.40 | 1.84666 | 23.94 |
| 7 | 289.8452 | 2.85 | 1.00000 | |
| 8 | 72.6123 | 4.60 | 1.62588 | 35.71 |
| 9 | 119.1875 | 16.97 | 1.00000 | |
| 10 | 45.6568 | 3.00 | 1.84666 | 23.94 |
| 11 | 37.8116 | 12.10 | 1.00000 | |
| 12 | ∞ (aperture stop) | 4.00 | 1.00000 | |
| 13 | 271.0125 | 3.12 | 1.76182 | 26.53 |
| 14 | −124.7583 | 2.00 | 1.83481 | 42.72 |
| 15 | 81.7076 | 28.91 | 1.00000 | |
| 16 | 385.3097 | 1.60 | 1.84666 | 23.94 |
| 17 | 42.0054 | 5.18 | 1.62588 | 35.71 |
| 18 | −93.7225 | 1.00 | 1.00000 | |
| 19 | 76.3603 | 1.66998 | 39.29 | |
| 20 | −45.9821 | 1.60 | 1.60738 | 56.83 |
| 21 | 34.8830 | 5.71 | 1.00000 | |
| 22 | −55.0447 | 1.70 | 1.48749 | 70.26 |
| 23 | 173.5912 | 4.13 | 1.00000 | |
| 24 | 66.1778 | 7.99 | 1.62004 | 36.28 |
| 25 | −51.8413 | 2.50 | 1.84666 | 23.94 |
| 26 | −98.4185 | 85.94 | 1.00000 | |

| Diffractive Surface Data | | |
|---|---|---|
| LD1 | C1 | −3.95579E−05 |

(Second Numerical Example)
f = 294.0 (mm) Fno = 4.31 2ω = 8.42°

| j | Rj | Dj | Nj | vj |
|---|---|---|---|---|
| 1 | 141.9128 | 7.89 | 1.48749 | 70.26 |
| 2 | −298.4405 | 0.15 | 1.00000 | |
| 3 | 103.6309 | 6.96 | 1.48749 | 70.26 |
| 4 | 1709.1750 | 0.45 | 1.70877 | 21.63 (LR1) |
| 5 | −9.9823E+13 | 0.93 | 1.00000 | |
| 6 | −704.3912 | 3.40 | 1.84666 | 23.94 |
| 7 | 312.1464 | 0.15 | 1.00000 | |
| 8 | 83.9618 | 4.28 | 1.62588 | 35.71 |
| 9 | 132.9057 (LD1) | 24.62 | 1.00000 | |
| 10 | 46.5416 | 3.00 | 1.84666 | 23.94 |
| 11 | 39.0555 | 11.76 | 1.00000 | |
| 12 | 36.8250 (aperture stop) | 0.00 | 1.00000 | |
| 13 | 271.0573 | 3.11 | 1.76182 | 26.53 |
| 14 | −116.0580 | 2.00 | 1.83481 | 42.72 |
| 15 | 81.7076 | 32.34 | 1.00000 | |
| 16 | 430.5218 | 1.60 | 1.84666 | 23.94 |
| 17 | 41.7218 | 5.13 | 1.62588 | 35.71 |

(Second Numerical Example)
f = 294.0 (mm) Fno = 4.31 2ω = 8.42°

| | | | | |
|---|---|---|---|---|
| 18 | −93.3203 | 1.00 | 1.00000 | |
| 19 | 78.1060 | 5.84 | 1.66998 | 39.29 |
| 20 | −44.7552 | 1.60 | 1.60738 | 56.83 |
| 21 | 34.7411 | 5.79 | 1.00000 | |
| 22 | −53.7728 | 1.70 | 1.48749 | 70.26 |
| 23 | 178.4754 | 4.17 | 1.00000 | |
| 24 | 65.9606 | 8.23 | 1.62004 | 36.28 |
| 25 | −47.1859 | 2.50 | 1.84666 | 23.94 |
| 26 | −89.6667 | 83.97 | 1.00000 | |

Diffractive Surface Data

| | | |
|---|---|---|
| LD1 | C1 | −4.62885E−05 |

(Third Numerical Example)
f = 87.3 (mm) Fno = 1.34 2ω = 27.8°

| j | Rj | Dj | Nj | νj |
|---|---|---|---|---|
| 1 | 83.3337 | 7.29 | 1.69680 | 55.53 |
| 2 | 588.1013 | 0.15 | 1.00000 | |
| 3 | 62.0900 | 10.39 | 1.83481 | 42.72 |
| 4 | 65.8867 | 0.15 | 1.00000 | |
| 5 | 55.1449 (aspherical surface) | 18.95 | 1.83400 | 37.16 |
| 6 | 129.3070 | 1.77 | 1.70877 | 21.63 (LR1) |
| 7 | 1455.6152 (LD1) | 3.74 | 1.84666 | 23.94 |
| 8 | 27.1909 | 12.21 | 1.00000 | |
| 9 | 35.1250 (aperture stop) | 0.00 | 1.00000 | |
| 10 | −28.8458 | 4.23 | 1.72151 | 29.23 |
| 11 | 100.2460 | 9.38 | 1.83481 | 42.72 |
| 12 | −43.5749 | 0.15 | 1.00000 | |
| 13 | 201.9952 | 4.17 | 1.83400 | 37.16 |
| 14 | −92.9218 | 1.60 | 1.00000 | |
| 15 | 140.4962 | 2.70 | 1.48749 | 70.24 |
| 16 | 2782.9796 | 39.00 | 1.00000 | |

Diffractive Surface Data

| | | |
|---|---|---|
| LD1 | C1 | −1.72219E−04 |

Aspherical Surface Data

| | | |
|---|---|---|
| Fifth Surface | B | −1.70955E−07 |
| | C | −8.93743E−12 |
| | D | −1.17124E−13 |
| | E | 4.51467E−17 |

(Fourth Numerical Example)
f = 24.5 (mm) Fno = 2.9 2ω = 93°

| j | Rj | Dj | Nj | νj |
|---|---|---|---|---|
| 1 | 65.1668 | 3.74 | 1.69680 | 55.53 |
| 2 | 160.5431 | 0.15 | 1.00000 | |
| 3 | 44.7659 | 2.12 | 1.80610 | 40.93 |
| 4 | 16.2129 | 5.75 | 1.00000 | |
| 5 | 18.7865 | 1.87 | 1.80518 | 25.42 |
| 6 | 21.4346 | 3.96 | 1.00000 | |
| 7 | 22.0539 | 1.84 | 1.79952 | 42.22 |
| 8 | 10.7320 | 2.47 | 1.00000 | |
| 9 | 57.5666 | 1.46 | 1.80518 | 25.42 |
| 10 | −165.6136 | 0.34 | 1.00000 | |
| 11 | −944.0887 | 2.74 | 1.54814 | 45.78 |
| 12 | 125.3176 | 4.20 | 1.00000 | |
| 13 | 0.0000 (aperture stop) | 0.52 | 1.00000 | |
| 14 | 37.8326 | 7.63 | 1.83400 | 37.16 |
| 15 | −19.3073 | 2.49 | 1.00000 | |

(Fourth Numerical Example)
f = 24.5 (mm) Fno = 2.9 2ω = 93°

| | | | | |
|---|---|---|---|---|
| 16 | −18.9022 | 3.89 | 1.84666 | 23.94 |
| 17 | 29.3359 (LD1) | 0.48 | 1.70877 | 21.63 (LR1) |
| 18 | 41.0331 | 1.09 | 1.00000 | |
| 19 | −77.6469 | 2.79 | 1.56384 | 60.67 |
| 20 | −16.1002 | 0.16 | 1.00000 | |
| 21 | −392.9321 | 2.44 | 1.58913 | 61.13 |
| 22 | −26.9820 | 37.19 | 1.00000 | |

Diffractive Surface Data

| | | |
|---|---|---|
| LD1 | C1 | −1.76518E−04 |

(Fifth Numerical Example)
f = 5.82-18.45-70.22 (mm) Fno = 2.88-3.8-3.56
2ω = 63.4°-22°-5.86°

| j | Rj | Dj | Nj | νj |
|---|---|---|---|---|
| 1 | 52.8532 | 1.40 | 1.84666 | 23.78 |
| 2 | 30.2616 (LD1) | 0.37 | 1.70877 | 21.63 (LR1) |
| 3 | 32.1752 | 3.78 | 1.60311 | 60.64 |
| 4 | −3291.2034 | 0.15 | 1.00000 | |
| 5 | 31.3617 | 2.12 | 1.62041 | 60.29 |
| 6 | 98.3870 | variable | 1.00000 | |
| 7 | 62.3065 | 0.89 | 1.77250 | 49.60 |
| 8 | 9.2698 | 3.32 | 1.00000 | |
| 9 | −65.1459 | 0.71 | 1.77250 | 49.60 |
| 10 | 16.7984 | 3.37 | 1.00000 | |
| 11 | 18.9762 | 1.49 | 1.92286 | 18.90 |
| 12 | 42.4232 | variable | 1.00000 | |
| 13 | 0.0000 (aperture stop) | variable | 1.00000 | |
| 14 | 8.4326 (aspherical surface) | 3.10 | 1.58913 | 61.15 |
| 15 | 120.5757 | 3.34 | 1.00000 | |
| 16 | 79.5816 | 0.90 | 1.90366 | 31.32 |
| 17 | 8.7262 | 0.60 | 1.00000 | |
| 18 | 18.5528 | 1.74 | 1.48749 | 70.23 |
| 19 | −15.4413 | variable | 1.00000 | |
| 20 | 0.0000 (aperture stop) | variable | 1.00000 | |
| 21 | 13.2150 | 2.82 | 1.71300 | 53.87 |
| 22 | −32.2934 (LD2) | 0.55 | 1.70877 | 21.63 (LR2) |
| 23 | −15.2127 | 0.94 | 1.68893 | 31.07 |
| 24 | 22.8471 | 10.37 | 1.00000 | |

| | Focal length | | |
|---|---|---|---|
| Variable Gap | 5.82 | 18.45 | 70.22 |
| D6 | 0.80 | 13.01 | 28.48 |
| D12 | 31.00 | 16 | 1.35 |
| D13 | 5.87 | 2.72 | 1.36 |
| D19 | 1.10 | 1.71 | 4.39 |
| D20 | 3.00 | 4.95 | 6.27 |

Diffractive Surface Data

| | | |
|---|---|---|
| LD1 | C1 | −8.44780E−05 |
| LD2 | C1 | −3.03602E−04 |

Aspherical Surface Data

| | | |
|---|---|---|
| Fourteenth Surface | k | −6.56135E−01 |
| | B | 7.61281E−06 |
| | C | 2.28418E−07 |
| | D | −1.80542E−09 |
| | E | 2.02947E−10 |

TABLE 1

| Material including dispersed $TiO_2$ microparticles | |
| --- | --- |
| Nd | 1.70877 |
| Ng | 1.75988 |
| NC | 1.70033 |
| NF | 1.73310 |
| νd | 21.63 |
| θgd | 1.5594 |
| θdC | 0.2576 |

TABLE 2

| Conditional Expression | Example 1 LD1&LR1 | Example 2 LD1&LR1 | Example 3 LD1&LR1 | Example 4 LD1&LR1 | Example 5 LD1&LR1 | Example 5 LD2&LR2 |
| --- | --- | --- | --- | --- | --- | --- |
| (1) | 0.2152 | 0.2152 | 0.2152 | 0.2152 | 0.2152 | 0.2152 |
| (2) | 0.0165 | 0.0165 | 0.0165 | 0.0165 | 0.0165 | 0.0165 |
| (3) | −1.62E−09 | −1.48E−09 | −6.62E−08 | −1.25E−07 | −1.09E−08 | −5.97E−07 |
| (9) | 4.00E−07 | 3.66E−07 | 1.64E−05 | 3.09E−05 | 2.69E−06 | 1.48E−04 |
| (10) | 21.63 | 21.63 | 21.63 | 21.63 | 21.63 | 21.63 |
| (11) | 0.149 | 0.223 | 0.069 | 0.038 | 0.101 | 0.024 |

Figure 12:
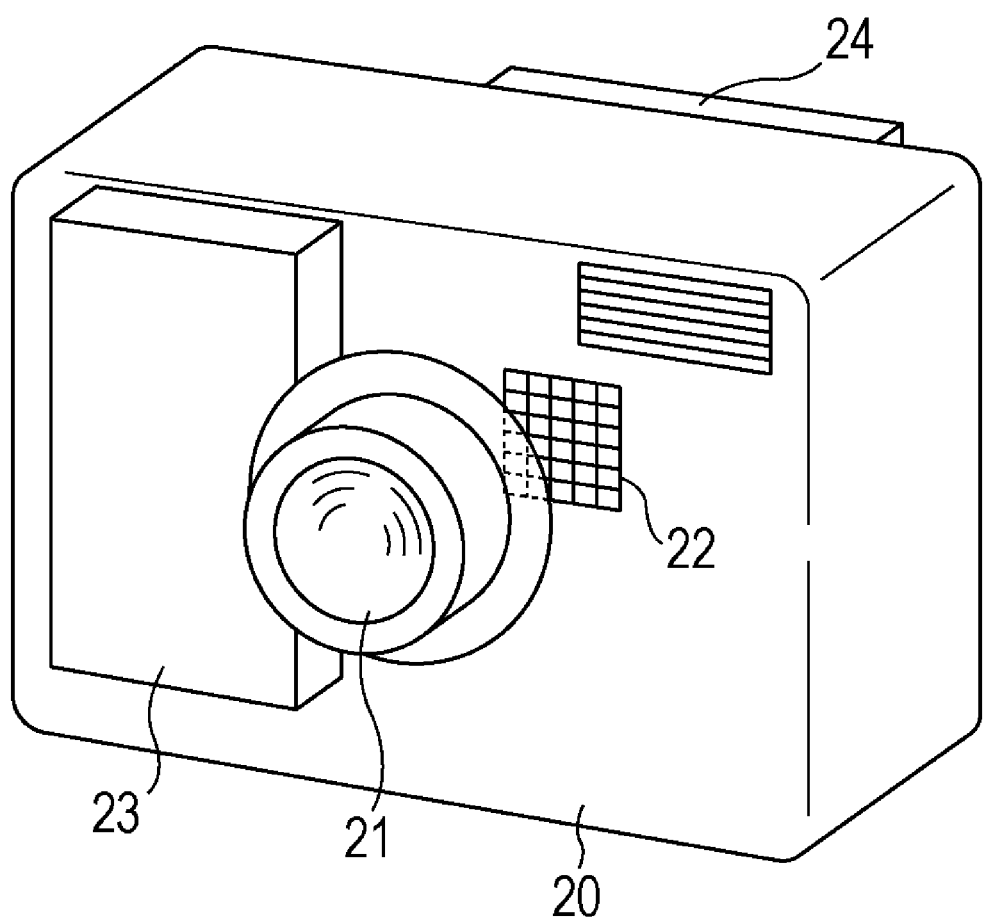
FIG. 12 is a schematic view illustrating the principal part of an image pickup apparatus according to the present invention.

Next, a description will be given of an example of an optical apparatus including the optical system of the present invention, with reference to FIG. 12. FIG. 12 illustrates an embodiment of a digital still camera using the optical system of the embodiments as an imaging optical system. In FIG. 12, reference numeral 20 denotes a camera body. An imaging optical system 21 is formed by any of the optical systems of the above-described first to fifth embodiments. A solid-state image pickup element (photoelectric conversion element) 22, such as a CCD sensor or a CMOS sensor) is incorporated in the camera body, and receives an object image formed by the imaging optical system 21. A memory 23 records information corresponding to the object image photoelectrically converted by the solid-state image pickup element 22. A viewfinder 24 is formed by a liquid crystal display panel or the like, and is used to observe the object image formed on the solid-state image pickup element 22. By thus using the optical system of the present invention in various optical apparatuses, the advantages of the present invention are enjoyed effectively.

According to the present invention, it is possible to obtain an optical system and an optical apparatus that can properly correct chromatic aberration over the entire visible wavelength range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST

L1: first lens unit
L2: second lens unit
L3: third lens unit
L4: fourth lens unit
LD1: first diffractive optical element
LD2: second diffractive optical element
LR1: first refractive optical element
LR2: second refractive optical element
SP: aperture stop
IP: image plane
d: d-line
g: g-line
C: C-line
F: F-line
ΔM: meridional image plane
ΔS: sagittal image plane

The invention claimed is:

1. An optical system comprising a diffractive optical element and a refractive optical element on at least one of an object side and an image side of an aperture stop, wherein the following conditions are satisfied:

$$|\Delta\theta_{gd}| > 0.038$$

$$0.003 < |\delta\theta_{dC}| < 0.038$$

$$(\Phi_R \times \nu_d \times \delta\theta_{dC}) \times (-\Phi_D) < 0$$

where $\nu_d$ represents an Abbe number of the refractive optical element, $\theta_{gd}$ represents a partial dispersion ratio for a g-line and a d-line, $\theta_{dC}$ represents a partial dispersion ratio for the d-line and a C-line, $\Phi_R$ represents an optical power provided when light incident and exit surfaces of the refractive optical element are both in contact with air, and $\Phi_D$ represents an optical power of the diffractive optical element, and
wherein $\Delta\theta_{gd} = \theta_{gd} - (-1.687 \times 10^{-7} \cdot \nu_d^3 + 5.702 \times 10^{-5} \nu_d^2 - 6.603 \times 10^{-3} \cdot \nu_d + 1.462)$, and $\delta\theta_{dC} = \theta_{dC} - (-0.1968\theta_{gd} + 0.5480)$.

2. The optical system according to claim 1, wherein the following condition is satisfied:

$$(\Phi_R \times \nu_d \times \Delta\theta_{gd}) \times \Phi_D > 0.$$

3. The optical system according to claim 1, wherein the following condition is satisfied:

$$\nu_d < 60.$$

4. The optical system according to claim 1, wherein the following condition is satisfied:

$$\Phi_D/\Phi_R < 0.4.$$

5. The optical system according to claim 1, wherein the diffractive optical element and the refractive optical element are provided in the same lens unit.

6. An optical apparatus comprising the optical system according to claim 1.

* * * * *